(12) United States Patent
Haimer et al.

(10) Patent No.: US 8,963,059 B2
(45) Date of Patent: Feb. 24, 2015

(54) INDUCTIVE CLAMPING DEVICE FOR CLAMPING AND UNCLAMPING TOOLS

(75) Inventors: Franz Haimer, Igenhausen (DE); Josef Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 1027 days.

(21) Appl. No.: 13/061,292

(22) PCT Filed: Aug. 13, 2009

(86) PCT No.: PCT/EP2009/005887
§ 371 (c)(1),
(2), (4) Date: Jun. 6, 2011

(87) PCT Pub. No.: WO2010/025814
PCT Pub. Date: Mar. 11, 2010

(65) Prior Publication Data
US 2011/0284525 A1  Nov. 24, 2011

(30) Foreign Application Priority Data

Sep. 4, 2008 (DE) .......................... 10 2008 045 781

(51) Int. Cl.
B23P 11/02 (2006.01)
H05B 6/14 (2006.01)
H05B 6/38 (2006.01)

(52) U.S. Cl.
CPC .............. B23P 11/027 (2013.01); H05B 6/14 (2013.01); H05B 6/38 (2013.01)
USPC .......................................... 219/635; 219/637

(58) Field of Classification Search
CPC ............ B23P 11/027; H05B 6/38; H05B 6/14
USPC ......... 219/635, 600, 607, 632, 637, 642, 643, 219/644, 676
See application file for complete search history.

(56) References Cited

U.S. PATENT DOCUMENTS

| | | | |
|---|---|---|---|
| 6,612,791 B1 * | 9/2003 | Haimer | 409/232 |
| 6,861,625 B1 | 3/2005 | Haimer et al. | |
| 6,991,411 B2 | 1/2006 | Irion et al. | |
| 8,309,895 B2 | 11/2012 | Haimer | |
| 2003/0209535 A1 | 11/2003 | Haimer et al. | |
| 2004/0149738 A1 * | 8/2004 | Haimer | 219/635 |

(Continued)

FOREIGN PATENT DOCUMENTS

| | | |
|---|---|---|
| DE | 3925641 | 8/1990 |
| DE | 19915412 | 10/2000 |

(Continued)

OTHER PUBLICATIONS

Marcel Dekker, Inc., "Steel Heat Treatment Handbook," 1997, Chapter 11A "Induction Heat Treatment".

*Primary Examiner* — Henry Yuen
*Assistant Examiner* — Phuong Nguyen
(74) *Attorney, Agent, or Firm* — Price Heneveld LLP

(57) ABSTRACT

In a device for inductively clamping and unclamping a tool shaft of a tool, in particular a rotating tool in a tool holder which includes a clamping sleeve that is open at a free end and made from electrically conductive material for receiving the tool shaft through friction locking concentrator elements are moveable relative to the rotation axis with a radial and an axial component into the operating condition for at least partial coverage of the free face of the clamping sleeve.

18 Claims, 6 Drawing Sheets

(56) References Cited

U.S. PATENT DOCUMENTS

| | | |
|---|---|---|
| 2008/0277386 A1 | 11/2008 | Haimer |
| 2010/0225074 A1* | 9/2010 | Haimer .................. 279/102 |

FOREIGN PATENT DOCUMENTS

| | | |
|---|---|---|
| DE | 10348880 | 5/2005 |
| DE | 102005005892 | 8/2006 |
| DE | 102005014984 | 10/2006 |
| DE | 202007009403 U1 | 9/2007 |
| DE | 102006016103 | 10/2007 |
| DE | 102006047796 | 4/2008 |
| EP | 2036658 | 3/2009 |
| FR | 1524221 | 5/1968 |
| JP | 4910034 | 3/1973 |
| JP | 3154730 | 4/2001 |
| JP | 2002540964 | 12/2002 |
| JP | 2003534139 | 11/2003 |
| JP | 2004538161 | 12/2004 |
| JP | 2005084565 | 3/2005 |
| JP | 2008537572 | 9/2008 |

* cited by examiner

INDUCTIVE CLAMPING DEVICE FOR CLAMPING AND UNCLAMPING TOOLS

FIELD OF THE INVENTION

The invention relates to an inductive clamping device which facilitates fixating tools through inductive heating and shrink fitting in a tool holder.

BACKGROUND OF THE INVENTION

Quick change systems for tools are known for a quick tool change of rotating tools like mills, drills and similar, wherein the quick change systems operate according to an inductive principle (cf. DE 39 25 641 A1). Thus, tool holders are used for receiving the tools to be clamped, wherein the tool holders have a clamping sleeve whose receiving bore hole is smaller than the exterior diameter of the tool shaft of the tool to be clamped. The induction coil that is concentrically applied to the clamping sleeve and fed by a power generator with AC power or pulsed DC power with a frequency of e.g. 10-50 kHz generates Eddy currents in the clamping sleeve based on the introduced magnetic flux field of the induction coil, wherein the Eddy currents cause a heating of the clamping sleeve and thus a respective expansion of the receiver bore hole of the clamping sleeve. The tool which is then inserted with its shaft into the receiver bore hole of the clamping sleeve is supported through a shrink fit and friction locking within the receiver bore hole of the clamping sleeve after respective cooling of the clamping sleeve. For removing the tool, the clamping sleeve is inductively heated again so that the receiving bore hole is expanded accordingly and the tool can be removed easily. In order to facilitate controlled heating of the clamping sleeve, so called magnetic flux concentrators are known (c.f. "Steel Heat Treatment Handbook", Marcel Dekker, IR, INC 1997, Chapter 11A, Induction Heat Treatment) which are arranged in particular on both face sides but also at the outer circumference of the induction coil and which bundle magnetic flux lines generated by the induction coil and insert them in a targeted manner into the portion of the clamping sleeve to be heated. Magnetic flux concentrators of this type can be formed from so-called transformer plates which are arranged at the faces of the induction coil in an annular manner or the magnetic flux concentrators are made from a ceramic oxide material, in particular ferrite. These materials are characterized in that they are magnetically conductive but not electrically conductive.

Known inductive clamping and unclamping devices with magnetic flux concentrators disposed at the front face of the induction coil often use annular concentrator elements (c.f. JP 49-10034 or DE 199 15 412 A1). In the known devices, the annular concentrator elements not only extend over the face of the induction coil but they extend at least partially also over the free face of the component to be heated for clamping. However, it is a disadvantage of these devices that they are respectively only configured for receiving components, thus tools, with a particular diameter which is detrimental in particular for tool changing devices since typically tools with different diameters have to be clamped alternatively, wherein different clamping sleeve sizes are then required for the tools with different diameters.

This not only makes the quick change system more expensive, but also makes its application more difficult.

In order to overcome this disadvantage, it is known from DE 10 2005 014 984 A1 to use a multi-component induction coil configuration which includes in particular two coil units which are placed onto a clamping sleeve as a concentric assembly and which are adjustable relative to one another in axial direction with respect to the rotation axis defined by the clamping sleeve. This facilitates adapting the length of the induction coil assembly to the respective size of the clamping sleeve used. It is known in the art that larger clamping sleeves are used for tools with larger shaft diameters, wherein the clamping sleeves have a greater fit length for clamping a tool shaft than clamping sleeves for tools with smaller diameters. Through a respective axial adjustment of the coil units of the induction coil configuration relative to one another adapted to the respective sizes of the clamping sleeves, an inductive clamping device of this type can be used for different clamping sleeves and thus tool diameters. In order to also facilitate a good induction of the magnetic flux lines generated by the induction coil assembly into the clamping sleeve for tools with different diameters, the known device is also provided with an adjustment of the diameter of the magnetic field concentrator in addition to the axial adjustment of the induction coil assembly, wherein the magnetic field concentrator is formed in the known device through concentrator elements through aperture type concentrator elements grouped in a ring shape, wherein the concentrator elements overlap one another and are radially pivotable in inward direction along a radial plane orthogonal to the rotation axis defined by the clamping sleeve. Thus, the aperture shaped concentrator elements can be pivoted in a suitable manner into a respective overlap with the free faces of clamping sleeves with different sizes. The axial adjustment of the induction coil assembly and the radial adjustment of the concentrator elements is coupled with one another and performed through a rotatable adjustment ring through a rotational position of the adjustment ring, wherein the rotational position of the adjustment ring determines the relative axial position of the coil units which are moveable relative to one another and also the radial pivot position of the aperture type concentrator elements. This device has proven useful in practical applications, but can still be improved in particular with respect to automating processes, but also with respect to a desired controlled and optimized introduction of the magnetic flux lines bundled by the concentrator elements into the clamping sleeve to be heated for receiving the tool.

SUMMARY OF THE INVENTION

It is an object of the invention to provide an inductive clamping device for clamping and unclamping tools with an axial position adjustment of an induction coil assembly formed from at least two coil units and with a diameter adjustment of the concentrator elements, which facilitates alignment of the coil units and also of the concentrator elements relative to the clamping sleeve also in consideration of the axial position change of the coil units of the induction coil assembly in adaptation to clamping sleeves with different sizes. Thus, a compact configuration of the clamping device shall be provided and also a reconfiguration for semiautomatic or fully automatic operations shall be provided in a simple manner.

The induction clamping device according to an aspect of the invention, includes an induction coil assembly concentrically surrounding the clamping sleeve preferably including two coil units arranged on one axis, wherein the coil units are adjustable relative to one another in axial direction, and the induction clamping device includes a concentrator assembly made from particular concentrator elements, which are movable into a position in the operating position of the induction coil placed onto the clamping sleeve in which the concentrator elements at least partially cover the clamping sleeve to be heated at its free face. Thus, the concentrator elements are adjusted in a linear manner, thus in a translatoric manner, in a direction towards the rotation axis defined by the clamping sleeve, thus with a radial component and also with an axial component. Thus, the concentrator elements, e.g., adapted to a clamping sleeve with smaller size for receiving a tool with smaller diameter are not only adjusted or moved radially inward to the rotation axis defined by the clamping sleeve, but they are also adjusted in axial direction towards the free face of the respective clamping sleeve. This facilitates alignment of the axially adjustable coil units and of the concentrator elements covering the free face of the clamping sleeve to be heated as a function of the clamping sleeve that is being used.

Thus, the position of the coil units can be adjustable or alignable in an optimum manner to the respective fit length of the clamping sleeve, wherein in particular the coil unit associated with the free end of the clamping sleeve shall possibly be aligned with the front end of the clamping sleeve. Thus, the bundled introduction of the magnetic flux lines can be heated when the concentrator elements are also moved as closely as possible towards the free face of the clamping sleeve for optimized heating of the clamping sleeve. This can now be achieved by radially and axially overlapping feeding of the concentrator elements, and thus for a particularly compact configuration of the clamping device.

Furthermore, the clamping device according to an aspect of the invention assures that the axial adjustment of the coil units of the induction coil assembly and the advancing of the concentrator elements can be performed independently from one another, which is relevant for an alignment of the components relevant for introducing the magnetic flux into the clamping sleeve, thus coil units and concentrator elements. Simultaneously, a fully automatic or also a semiautomatic operation of a device of this type is facilitated by driving the adjustment mechanism for the induction coil assembly and the adjustment mechanism for the diameter adjustment of the concentrator elements through separate drives.

The concentrator elements can be movable in a linear manner through slides in the direction of the rotation axis defined by the clamping sleeve, wherein the concentrator elements are received at the inward oriented faces of the slides. Thus, an embodiment has proven advantageous from a practical point of view, wherein overall six slides are being used, which are distributed over the circumference, wherein the slides are respectively adjustable relative to the rotation axis through supports which are arranged in a linear manner like a star. Thus, the movement direction of the slides can enclose an angle of approximately 60° to 80°, and thus particularly preferably an angle of 65° to 75° with the rotation axis. The slides are thus made from magnetically nonconductive material, for example, from ceramic material or plastic material, and they are received in grooves of a support collar, which is also made from magnetically nonconductive material, e.g., plastic material. The magnetically nonconductive material can be received within another annular concentrator element, which essentially axially extends the magnetic flux concentrators arranged at the jacket surface of the coil units.

In particular, in view of the compact configuration of the clamping device, the concentrator elements arranged at the inner end of the slides can be arranged in an alternating manner, axially offset to one another and overlapping with one another, in which a substantially closed magnetic field concentrator can be formed in any radial position of the concentrator elements with reference to the rotation axis defined by the clamping sleeve, wherein the magnetic field concentrator is configured from the particular concentrator elements, which are grouped about the rotation axis in ring shape.

The feed movement of the slides can be performed through a suitable cam-/control curve mechanism, wherein the control curves are configured to be adapted to the different sizes of the clamping sleeves to be used.

The concentrator elements can be configured from ferrite. In this context, at least some of the slides, for example, every second slide, can include a stop bar of magnetically nonconductive material, e.g., aluminum, wherein the stop bar axially extends to some degree beyond the concentrator elements and thus acts as a stop relative to the free face of the clamping sleeve. The extension of the stop bars beyond the concentrator elements is in a range of 0.2 to 0.6 mm and thus preferably 0.3 to 0.4 mm. This assures a careful treatment of the concentrator elements made from brittle material.

According to another aspect of the invention, an induction attachment made from magnetically nonconductive but electrically conductive material can be provided in particular, wherein the induction attachment is in particular made from copper. The induction attachment causes an active shielding of the tool protruding outward beyond the clamping device with respect to the remaining scatter fields of the induction coil in this portion. When there are scatter fields, the induction attachment generates Eddy currents in the attachment which in turn cause the formation of a magnetic field, which superimposes scatter fields of the induction coil assembly and thus weakens them. The induction attachment in combination with or as an alternative to a shielding collar made from magnetically conductive material arranged in a transition portion between the coil assembly and the clamping sleeve leads accordingly to a controlled orientation of the magnetic fields generated by the coil assembly in a direction towards the clamping sleeve and also leads to an active shielding of the tool section protruding beyond the clamping device, which leads to an overall optimization of the clamping process and also the unclamping process.

For axially adjusting the coil units of the induction coil assembly, support rings can be provided which are arranged concentric to one another and so that they overlap and wherein the inner support ring is fixated to the device, but the outer support ring is configured rotatable. Rotating the outer support ring causes an axial movement of the two coil units of the induction coil assembly which in turn is also performed through a cam-/control curve mechanism which is configured suitably adapted to the different clamping sleeves to be used with the clamping device.

Respective rotational adjustment of the outer support ring facilitates adjusting the axial position of the two coil units relative to one another.

The feed movement of the concentrator elements arranged on slides made from magnetically nonconductive material can be provided through a control collar supported on the outer circumference of the outer support ring, wherein a control ring is arranged at the front side of the control collar, wherein the control ring includes circumferentially distributed control curves for the respective slides. Respective cam pins are arranged on the slides, wherein the cam pins interact with the control curves. The control collar is supported on the outer support ring through a roller element bearing, so that the control collar can be rotated independently from the outer support ring. Thus, the feeding of the slides is completely independent from the adjustment of the coil units of the induction coil assembly, which is advantageous for fully automated operations. The support of the control collar on the outer support ring can be provided through a preloaded roller bearing strip, which facilitates a smooth running adjustment without clearance of the control collar for feeding the slides bearing the concentrator elements.

The clamping device can be operated in a fully automatic or semiautomatic manner when the control collar for the feed movement of the slides and also the outer support ring for adjusting the coil units relative to one another are respectively provided with a teething, in particular with an at least partially circumferential tooth collar, so that the control collar and also the outer control ring are drivable through a motor with a respective transmission advantageously connected there between. For transmissions, in particular worm shafts, are suitable, which interact with the teethings on the control collar and on the outer support ring. Each of the two worm shafts can be connected with a motor shaft through an intermediary transmission including a gear and a sprocket. Both motors can be mounted on a slide, which is supported in a linear manner through a guide bar on a table that is attached to the device, so that the two motors arranged on the slide including the intermediary transmissions are relatively movable adjusting to the axial movability of the coil units.

This configuration can render the diameter that is enclosed by the concentrator elements that are grouped in an annular manner about the rotation axis defined by the clamping sleeve, and the positional adjustment of the coil units of the induction coil assembly separately adjustable relative to one another, which in particular provides controllable adjustment options for particular applications. Furthermore, the adjustment of the diameter and the adjustment of the length of the induction coil assembly do not influence each other for allowing control during automated operation.

For automated operations, the respective geometry data of a chuck or a clamping sleeve of a tool holder are determined automatically for a fully automated shrinking process, wherein the chuck or the tool holder can be configured with a respective data carrier. For example, the data can be derived from an external database. Thus, the geometry data of the chuck can be automatically associated through digital image processing, laser scanners, distance sensors and similar, and the shrink parameters can be automatically associated and thus the coil can be automatically adjusted. The connection of a worm gear transmission allows for this implementing a self-hemming transmission, thus particular locking positions in the control curves are not required anymore. Also, additional locking mechanisms can thus be omitted. Motors with absolute encoders can be used, so that reference points do not need to be approached. The power supply of the drive unit can be turned on and off through a control signal together with the shrink electronics. Furthermore, the assembly is configured overall, so that the clamping devices can be easily retrofitted for automated driving, which only requires mounting the respective table with the clamping slide for the motors and the transmission.

BRIEF DESCRIPTION OF THE DRAWINGS

Subsequently, an embodiment of the invention is described with reference to drawing figures, wherein.

DETAILED DESCRIPTION OF PREFERRED EMBODIMENT

Figure 1:
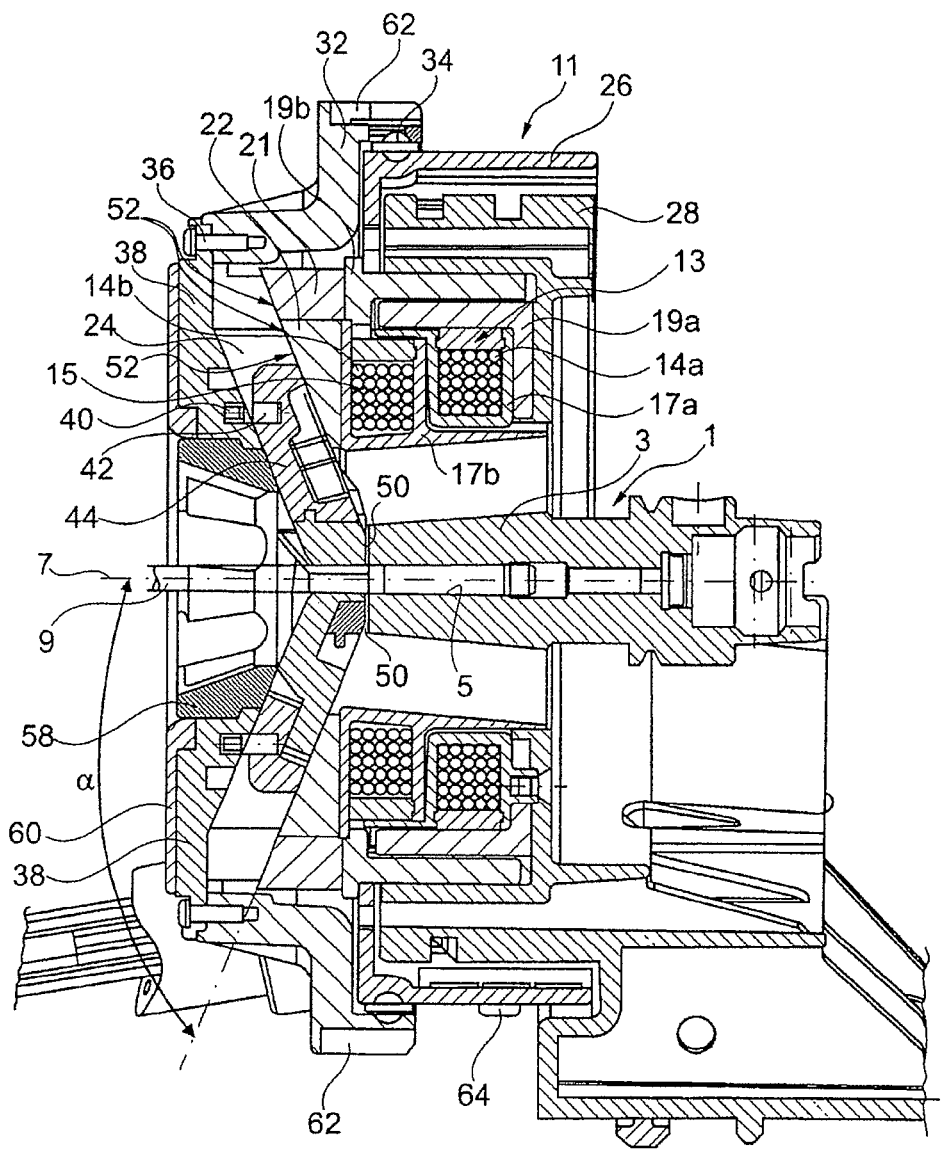
FIG. 1 illustrates a sectional view of an embodiment of the inductive clamping device according to the invention in a first operating position.

FIG. 1 illustrates a typical standard tool holder configured as an adapter, which is used for clamping tools like e.g., a turning tool, drill and similar into a fast running machine tool, like e.g., a lathe. The tool holder 1 is formed from a material that is at least electrically conductive, like e.g., steel, and includes a receiver or a clamping sleeve for clamping a tool at the forward end of the clamping sleeve illustrated on the left, wherein the tool with its tool shaft is clamped in the clamping sleeve 3. The clamping sleeve 3 is cone shaped and includes a central bore hole 5 which defines a rotation axis designated as 7 and which is open in particular towards the free end of the clamping sleeve 3. The shaft 9 of the tool to be clamped, wherein the shaft is only schematically illustrated, is inserted through this opening, so that the shaft is then received in the bore hole 5. The exterior diameter of the shaft 9 is then slightly larger than the free nominal diameter of the receiver bore hole 5, so that the shaft 9, when it is inserted in the bore hole 5, is supported in the clamping sleeve 3 through a friction locking press fit for transferring the operating torque. In order to be able to insert the tool shaft 9 into the tool holder 1 and in order to be able to also remove it, the clamping sleeve 3 is expanded through heating. This is facilitated through the inductive clamping and unclamping device designated 11, which includes an induction coil assembly designated 13 including two coil units 14a, 14b, wherein the coils in the two coil elements 15 are only schematically illustrated with circles.

By heating the clamping sleeve 3, the clamping device 11 is applied to the clamping sleeve 3 from the left, wherein the induction coil 13 or the two coil units 14a and 14b then concentrically enclose the clamping sleeve 3. The induction coil is fed by a power generator with AC power or pulsed DC power with a frequency of e.g., 10 to 50 kHz. The magnetic flux generated by the approximately cylindrical winding of the coil elements 15 induces Eddy currents in the clamping sleeve 3, which heat the clamping sleeve in a relatively short period of time, thus expanding the receiver bore hole 5 accordingly, so that the tool shaft 9 can be accordingly inserted into the oversized receiver bore hole 5 of the clamping sleeve 3.

After cooling the clamping sleeve 3, it shrinks about the inserted tool shaft 9 so that it is supported through friction locking through a shrink fit of the clamping sleeve 3 and thus supported in the tool holder 1.

In order to remove the tool, the clamping sleeve has to be heated analogously through the induction coil so that the receiver bore hole 5 is expanded accordingly and the tool can then be pulled out of the receiver bore hole 5.

Each winding of a coil unit 14a, 14b and thus each coil element 15 is surrounded according to the illustration in FIG. 1 by a coil housing 17a, 17b made from a temperature resistant plastic or ceramic material, wherein the coil housing 17b includes a sleeve section reaching under the coil housing 17a, so that as described infra in more detail, a relative axial adjustment of the two coil units 14a, 14b is facilitated along the rotation axis 7.

The coil element 15 of the coil unit 14b and also of the coil unit 14a is enveloped by a sleeve shaped concentrator 19b or 19a and thus on the side of the outer jacket of the coil elements. The concentrator sleeve 19b thus reaches over the cylindrical section of the concentrator sleeve 19a, which means the two sleeves are configured accordingly concentric to one another and to the rotation axis 7, and inserted into one another in turn for providing the axial movability of the two coil units relative to one another, which will be described subsequently. The concentrator sleeve 19a thus covers the face of the coil unit 14a at the right side of FIG. 1. A face coverage of the coil unit 14b, however, is not provided for the concentrator sleeve 19b, which only concentrically envelopes the coil unit 14b. However, a concentrator ring designated 21 joins the left face of the concentrator sleeve 19b, wherein the concentrator ring, like the concentrator sleeves 19a, 19b, is made from magnetically conductive but electrically nonconductive material, like e.g., an oxide ceramic material, in particular ferrite. The concentrator ring 21 thus extends the concentrator sleeve 19b axially at its free face but does not cover the free face of the coil unit 14b as evident from FIG. 1. The free face of the coil unit 14b is thus not closed by a concentrator in the illustrated embodiment.

A support collar 22 made from magnetically nonconductive and can also be electrically nonconductive material, like e.g., plastic material, is arranged in the opening of the concentrator ring 21, wherein the support collar includes plural support grooves 24 distributed along its circumference, wherein the support grooves are used for receiving adjustable slides, which will be described infra. In the illustrated embodiment, overall six circumferential support grooves 24 are provided as apparent from FIG. 3.

An outer support sleeve which is provided for relative axial adjustment of the two coil units 14a and 14b and designated as 26 is provided concentrically over the induction coil assembly 13. Another inner support ring 28 is arranged within the support ring 26 wherein the support ring 28 is fixated relative to the inductive clamping device. On the other hand, the outer support ring 26 is rotatable relative to the support ring 28. On the outer circumference 30 of the inner support ring, plural suitable control curves are provided circumferentially distributed, wherein the control curves engage the cam pins of the outer support ring 26 which are not illustrated herein. Furthermore, the concentrator sleeve 19b is connected rotationally fixated but longitudinally adjusted with the inner support ring 28. Four control curves are provided in the illustrated embodiment.

Figure 2:
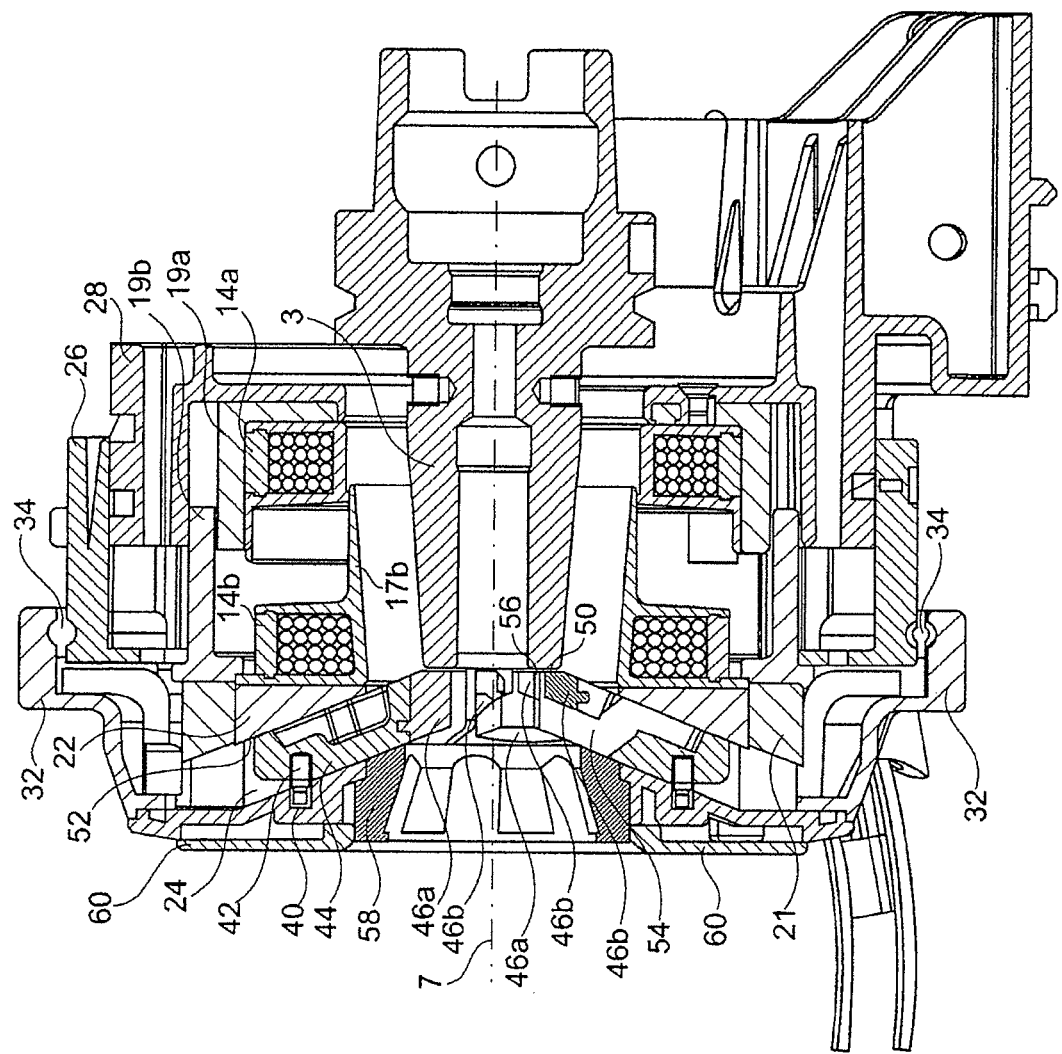
FIG. 2 illustrates a sectional view of the inductive clamping device illustrated in FIG. 1 in a second operating position.

When the outer support ring 26 is e.g., rotated manually, then as a consequence of the cam control mechanism recited supra the support ring 26 e.g., in FIG. 1 is axially adjusted to the left and accordingly translatorically transports the coil unit 14b with the concentrator sleeve 19b, the concentrator ring 21 and the support collar arranged therein to the left. Thus, the induction coil assembly 13 is axially extended in that the coil unit 14 is accordingly extended translatorically or in a linear manner like a telescope and along the rotation axis 7 which yields an accordingly extended position as illustrated in FIG. 2.

The type of longitudinal adjustment of the coil unit 14b relative to the coil unit 14a can certainly be performed in various manners and is already known in the art as described in DE 10 2005 014 984 A1 which is incorporated by reference and has already been cited supra as pertinent prior art.

In the illustrated embodiment, an axial adjustment of the coil unit 14b including its surrounding concentrator sleeve and the concentrator ring 21 axially extending the concentrator sleeve 19b in an outward direction including the support collar received therein is provided according to the rotation of the outer support ring 26, wherein the elements however are only moveable in longitudinal direction, but are coupled torque proof with the outer support ring 26, so that the components do not rotate with the outer support ring 26.

An additional housing ring, namely an adjustment collar 32, is rotatably arranged on the outer support ring 26 and thus through a ball bearing strip which is only schematically indicated and arranged on the outer support ring 26, wherein the ball bearing strip can be preloaded to prevent clearance and in order to provide smooth adjustment. The ball bearing strip is designated with the reference numeral 34 and includes a plurality of bearing balls that are received in a strip and distributed over the circumference. Components of this type are known so that they do not have to be described in detail.

This roller bearing, however, facilitates smooth rotatability without clearance of the adjustment collar 32 relative to the outer support ring 26. An adjustment ring 38 is fixated at the adjustment collar 32 namely through the threaded connections indicated with the numeral 36 so that the adjustment ring is co-rotated when rotating the adjustment collar 32. The adjustment ring 38 includes plural, e.g., six, control curves 40 distributed over the circumference on the surface of the adjustment ring oriented towards the clamping sleeve 3. Cam pins 42 interact with the control curves 40, wherein the cam pins are arranged at slides 44 which are received in the support grooves 24 of the support collar 22 in a rotationally fixated but linear moveable manner.

Figure 3:
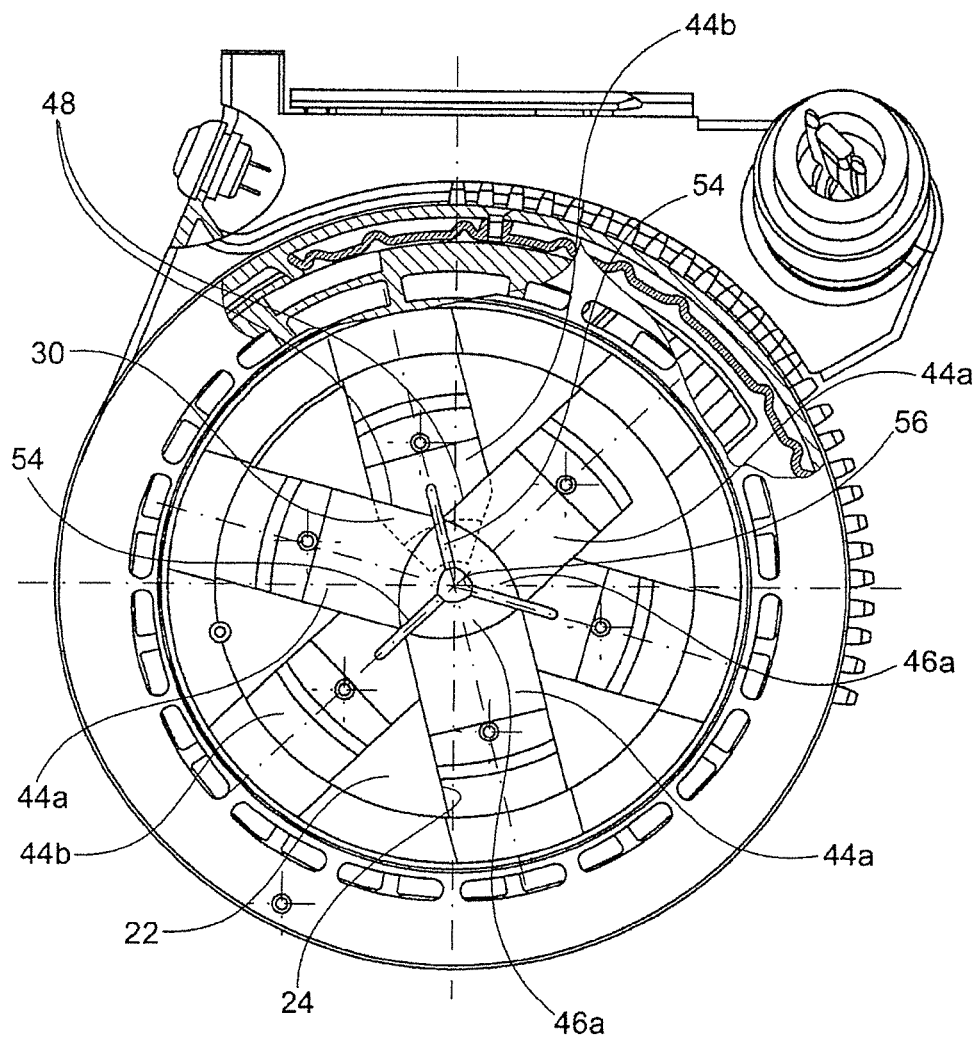
FIG. 3 illustrates a face view of the device illustrated in FIG. 1 from the left side for illustrating details of slides that are movable in a linear manner with concentrator elements of the device arranged thereon.

In the illustrated embodiment, a total of six slides 44 are provided that are arranged, so that they are distributed at even angular spacing over the circumference of the slide 44 as evident from FIG. 3. The slides are made from magnetically non-conductive and can be electrically non-conductive material, e.g., plastic or ceramic material, and are supported so that they are moveable in a linear or translatoric manner in the support grooves 24 in a direction towards the rotation axis 7.

According to FIG. 3, the grooves 24 and the slides moveably received therein are arranged about the rotation axis 7 in a radial star pattern. Concentrator elements are provided at the forward inner ends of each slide 44, wherein two different concentrator elements 46a and 46 b are provided in the illustrated embodiment for a total of six slides 44. This is quite apparent from FIG. 3. The slides designated as 44a in FIG. 3 include the concentrator elements 46a at their inner ends, whereas the other concentrator elements designated as 44b include concentrator elements designated as 46b, wherein one of the concentrator elements 46b is illustrated in FIG. 3 in dashed lines for illustration purposes like the portion of the slide 44b which is arranged behind the two laterally adjacent slides 44a. This means the concentrator elements 44a and 44b are slightly offset axially relative to the rotation axis 7.

In order to assure this, the slides 44b, which furthermore are substantially flush with their two main surfaces with the main surfaces of the slides 44a, include steps at 48 so that the slides section illustrated with dashed lines in FIG. 3 reaches below the forward sections of the slides 44a at 30. This configuration is selected so that the three concentrator elements 46a illustrated in FIG. 3 which are arranged at the inner front ends of the slides 44 quasi yield an annular concentrator which acts like a closed concentrator ring but is assembled from particular concentrator elements. The concentrator ring or the concentrator elements cover the free front face 50 of the clamping sleeve 3 and preferably completely in the operating position of FIG. 1. Forming a quasi annular concentrator from the concentrator elements 46 with a radial coverage of the free face 50 of the clamping sleeve 3, however, shall also be provided for a clamping sleeve with a larger diameter for clamping a tool shaft with a larger diameter and thus also in a position according to FIG. 2 in which the slides 44 in a manner to be described infra have been moved in an outward direction away from the rotation axis. This is facilitated through the arrangement and configuration of the concentrator elements 46a and 46b recited supra since the alternatively overlapping concentrator elements 46a and 46b in the further removed position of the slides from the rotation axis 7 and thus in the further removed position of the concentrator elements, the concentrator elements in turn form a substantially annular concentrator with one another which radially covers the free face 50 of the larger clamping sleeve 3 as clearly illustrated in FIG. 2.

The configuration of the concentrator elements 46a and 46b that provides the overlap is also quite apparent from FIG. 2 and namely from the perspective illustration of the concentrator element 46a, 46b proximal to the face side receiver opening of the clamping sleeve 3. Furthermore, the concentrator elements in the outer operating positions illustrated in FIGS. 1 and 2, namely in the position of the slides 44 moved inward towards the rotation axis in FIG. 1 and in the position where the slides are moved outward according to FIG. 2 cover the face of the clamping sleeve and substantially close the clamping sleeve in radial direction. The concentrator elements 46a and 46b, however, do not extend into the portion of the free face of the coil units of the induction coil assembly.

The control of the slides in the particular operating positions is performed through the cam-control curve mechanism 40, 42 recited supra, wherein the pins 42 slide in the control curve upon rotation of the adjustment collar 32 and thus of the adjustment ring 38 and thus the slides 44 received in the control grooves 24 are moved in a linear manner either in a direction towards the rotation axis 7 or away from the rotation axis 7. Thus, as described supra the annular collar of the concentrator elements 46a, 46b is expanded or closed (c.f. operating position in FIGS. 1 and 2). This is performed according to the size of the clamping sleeve 3 that is being used. Thus, the control curves 40 provided over the circumference are configured according to the clamping sleeve sizes that are useable in the clamping device and the control curves are optionally indexed so that the slides coupled with the cam pins 42 are accordingly fed towards the rotation axis 7 as a function of the section of the control curves 40 in which the cam pins 42 are disposed. Indexed control curves of this type are known. Reference is made in this respect to the pertinent prior art in DE 10 2005 014 984 A1.

The clamping device can feed the slides and thus feed the concentrator elements 44 and 46 at a slant angle relative to the rotation axis so that the feeding movement includes a radial and an axial component. Thus, the bases of the control grooves are placed at a slant angle within the support collar 22 as indicated in FIG. 2 and FIG. 1 with the reference numeral 52. The slant angle is indicated in FIG. 1 and designated with the angular designation α. Thus, the angle α is in a range of 60° to 80°, preferably 65° to 75°.

Since the concentrator elements 46a, 46b are formed from magnetically conductive material, typically ferrite or another suitable oxide ceramic material is used which is comparatively brittle and fracture prone, stop bars 54 are arranged at the slides 44b, wherein the stop bars are made from a stronger material which is magnetically non-conductive. Thus, e.g., aluminum is used. The stop bars 54 are kept narrow compared to the width of the concentrator elements 46a, 46b since they only have a stop function.

As is apparent from FIG. 2, each stop bar 54 includes a bar shaped protrusion at its radial inner section 56, wherein the bar shaped protrusion protrudes slightly, namely approximately 0.2 to 0.6 mm, or 0.3 to 0.4 mm, beyond the free face of the concentrator elements 46a, 46b, wherein the free face is adjacent to the clamping sleeve 3. Thus, it is respectively assured for the linear movement of the slides in a direction towards the free face 50 of the clamping sleeve 3 that the aluminum bars 54 come in contact with the free face 50 of the clamping sleeve 3 and not the brittle concentrator elements. Regardless, the concentrator elements are moved correspondingly close to the free face or face surface of the clamping sleeve 3, so that the magnetic flux can be concentrated or bundled in the clamping sleeve 3 through the concentrator elements in order to heat the clamping sleeve.

As is apparent from FIGS. 1 and 2, eventually an additional shielding collar 58 made from magnetically conductive, however, electrically nonconductive material, e.g., made from ferrite, is provided, wherein the shielding collar is configured annularly and extends essentially axial to the rotation axis 7, and thus, so that it extends in a conical manner in outward direction. Thus, the collar is arranged in an opening of the adjustment ring 38. This leads to an additional effective shielding of the portion of the tool protruding from the clamping sleeve 3, wherein the tool is clamped in the clamping sleeve, and thus prevents the heating of the tool.

Alternatively or additionally, an induction attachment designated as 60 can be provided, which is electrically conductive but magnetically nonconductive, and can be made from copper. The induction attachment 60 is thus formed as an essentially flat annular copper disk, which, however, is essentially flush with the front of the clamping device, however, it can also be configured as an induction attachment that is conical and protrudes outward. The illustrated embodiment with the copper disk 60, however, can save installation space, since it does not impair the compact configuration of the illustrated induction clamping device.

The operation of the induction coil generates Eddy currents in the copper induction attachment through exiting magnetic scatter fields, which in turn generate an opposite magnetic field, which reduces the magnetic scatter field of the induction coil. Also, this facilitates an additional, namely active shielding in the outer portion of the clamping sleeve 3.

The slanted support of the slides and thus the slanted position of the concentrator elements received on the inside of the slides can result in that the concentrator elements are not only moved radially in a direction towards the rotation axis 7, but also with an additional axial component in a direction towards the clamping sleeve 3 into their operating position, and thus also an alignment of the induction coil units 14a, 14b is facilitated and thus for tool holders with different sizes and thus clamping sleeves with different sizes for different tool diameters. Thus, when the coil units 14a, 14b are axially extended relative to one another, the coil units are respectively arranged in a favorable manner with reference to the actual shrink fit portion within the clamping sleeve. This means for the coil unit 14b illustrated in FIG. 2 on the left that the coil unit is arranged respectively in the portion of the free end of the clamping sleeve 3, so that it totally covers the clamping sleeve 3. Thus, it shall also be assured that the concentrator elements arranged at the slides are disposed as closely as possible at the free face of the clamping sleeve, and substantially close the clamping sleeve, so that the magnetic flux generated by the induction coil can be introduced in a concentrated manner into the clamping sleeve portion to be heated. This is facilitated in a precise manner through the slanted feeding of the slides and of the concentrator elements connected therewith, which would not be possible for a purely radial feed movement of the concentrator elements in adaptation to different clamping sleeve diameters.

It is apparent that the illustrated embodiment is configured so that the feeding of the slides with the concentrator elements covering the free surface of the clamping sleeve is performed separately and independently from the adjustment of the axial length of the two coil units 14a, 14b relative to one another. This can be facilitated through an individual adjustment which is advantageous in particular for fully automated operations. This is facilitated by decoupling the adjustment collar 32 relative to the outer support ring 26 with a roller element bearing connected therebetween, wherein a roller bearing strip is used for this purpose.

Figure 4:
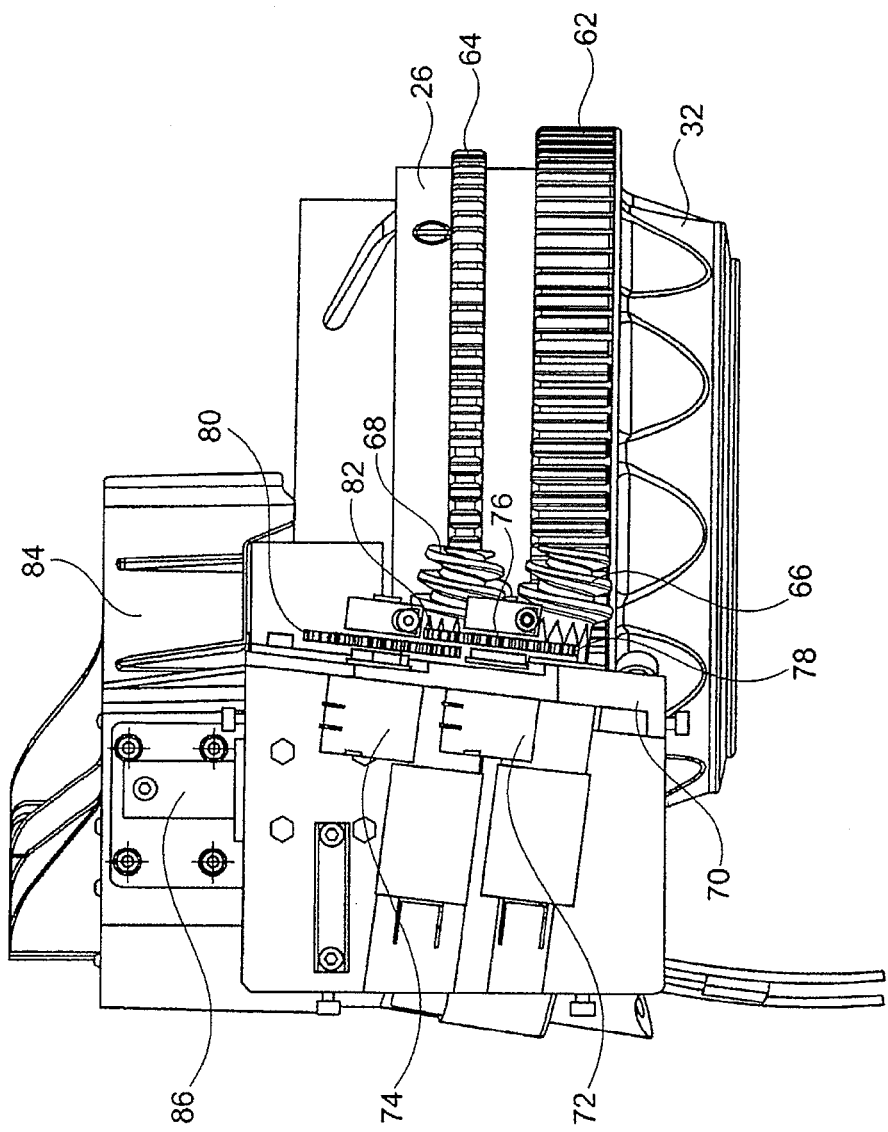
FIG. 4 illustrates a lateral view of the device according to the preceding figures.
Figure 5:
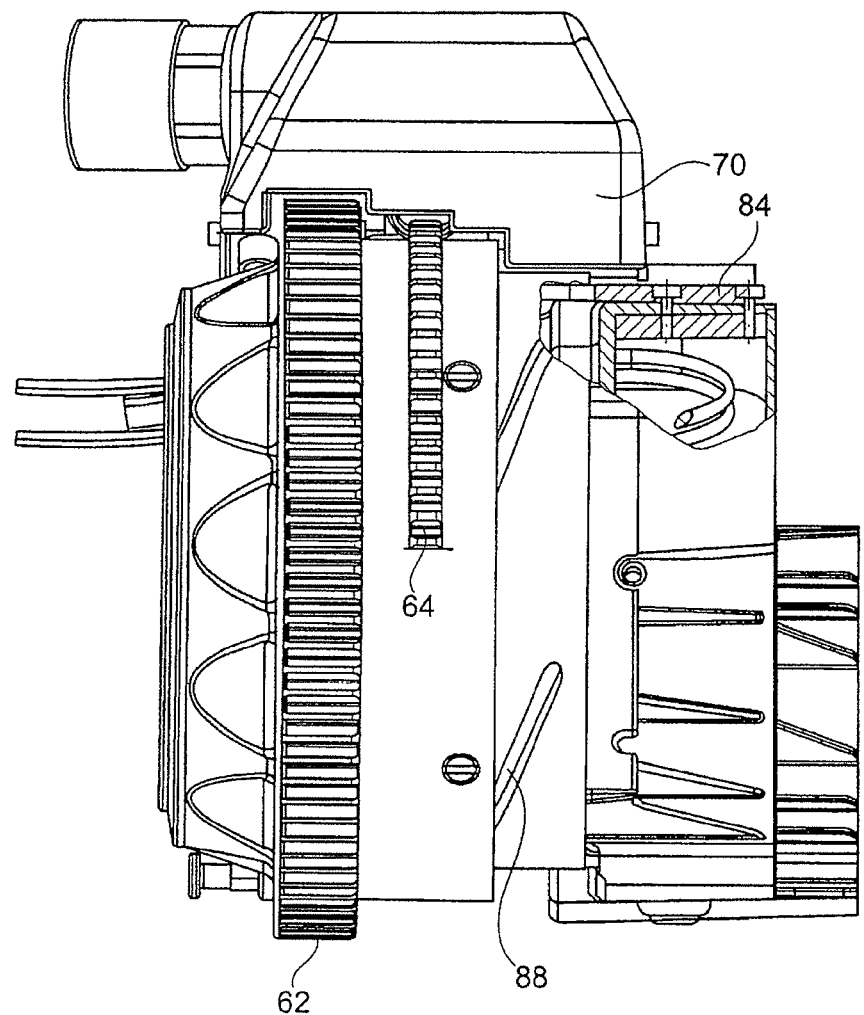
FIG. 5 illustrates another lateral view of the device according to FIG. 4, however in a view that is offset by 90°.

It is helpful for fully automated operations when a teething is provided at the outer circumference of the adjustment collar, wherein the teething is configured as a circumferential sprocket 62. Another sprocket is disposed at the outer circumference of the outer support ring 26 and designated as 64. This facilitates motorized operations of the adjustment collar 32 for adjusting the slides and also the outer support ring 26 for axially adjusting the coil units 14a, 14b relative to one another. This is illustrated in particular in FIGS. 4 and 5.

In the illustrated embodiment, worm shafts 66 and 68 mesh with sprockets 62 and 64, which are arranged at a mounting slide 70 through a shaft, wherein the mounting slide also receives two motors 72 and 74. Thus, the motor 72 drives a sprocket 78 connected with the worm gear 66 through a gear 76, so that the adjustment sprocket 62 for advancing and pulling back the slides with the concentrator elements 46a, 46b can be actuated through the motor 72. Separately therefrom, the worm gear 68 for rotating the outer support ring 26 can be actuated through the motor 74 through a gear-/sprocket pair 80, 82, so that the outer support ring can be actuated for axially adjusting the coil units relative to one another.

The slide 70 which also includes the two motors 72 and 74, including their transmissions, is arranged on a mounting table 84 that is attached to the device and thus so that the table is movable along a linear support 86. Thus, the slide 70 can follow the outer support ring 26 during axial adjustment of the coil units, wherein the outer support ring 26 is axially adjusted relative to the inner bearing race 28 that is attached to the device. This support is also evident from FIG. 5, which also illustrates the control curves 88 on the outer jacket of the inner support ring 28 of the cam control mechanism for the coil adjustment. Thus overall, four support curves 88 are provided with which the outer support ring 26 interacts through respective cam pins (not illustrated).

This embodiment facilitates diameter adaptations and length adaptation as a function of different clamping sleeve sizes and thus different tool diameters. Additionally, both adjustments can be controllable by a motor in a coupled manner but they can also be controllable independently from one another which is helpful for special applications. As a consequence of the separate adjustability of the diameter and the length of the distance coil of the coil units, simple controllability is provided for fully operated operations.

Thus, the respective geometry and shrink parameters with respect to different shrink fit chucks can either be read in from an external data source or through a suitable scanner which reads from a respective data carrier on the shrink fit chuck and thus facilitates the respective adjustment and control of the two motors 72 and 74 as a function of a suitable software.

The geometric data of the chuck can thus be automatically determined in different manners e.g., through digital image processing, laser scanners and distance sensors through which the shrinking parameters can automatically be assigned according to the size of the shrink fit chuck and the coil can be automatically adjusted with respect to its axial length. A slide can be used for both motors for the intended space saving and compact configuration.

Using worm gears can facilitate implementing a self-hemming drive, thus additional locking mechanisms for the set operating conditions are not required.

As long as a respective teething is already provided on the adjustment collar 32 and on the outer support ring 26, the manually actuatable inductive clamping device can be subsequently reconfigured easily to the fully automated and semi automated operation.

Figure 6:
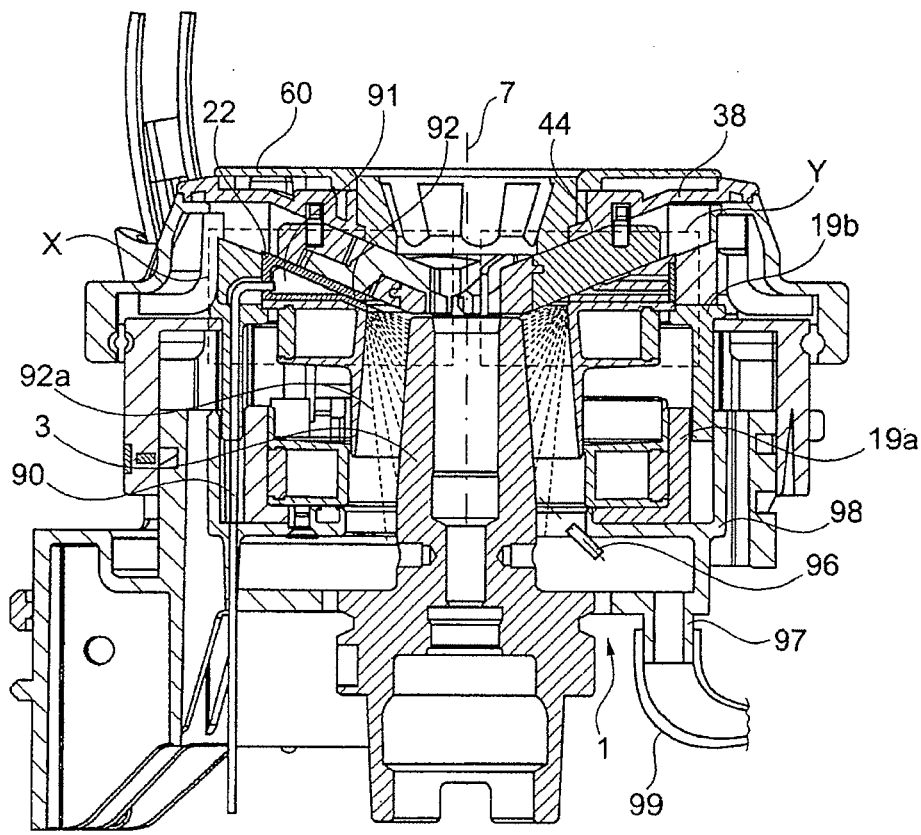
FIG. 6 illustrates a lateral view of another analogous embodiment of an inductive clamping device according to the invention according to an embodiment according to FIGS. 1-4 with additional details.
Figures 7, 8:
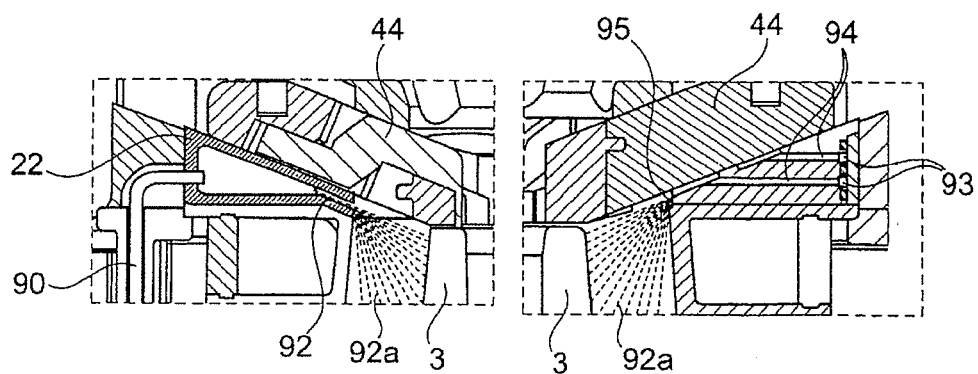
FIG. 7 illustrates a detail X of FIG. 6 in an enlarged depiction (scale 2:1)
FIG. 8 illustrates a detail Y from FIG. 6 again in an enlarged embodiment (scale 2:1).

The embodiment which is illustrated in FIGS. 6-8 shows additional details for an inductive clamping device of this type.

On the one hand, a cooling medium supply conduit designated with the reference numeral 90 is shown in FIG. 6 which is connected to a conventional cooling medium reservoir which is not illustrated herein and wherein the cooling medium supply conduit opens into a cavity 91 of the support collar 22. In the portion of the cavity 91, the support collar 22 at its radially inner end is configured with a slot shaped nozzle shaped channel 92 through which coolant is jetted into a chamber 92a which envelopes the clamping sleeve 3. Any suitable coolant can be used as a coolant. For example, a water mist can be generated in the chamber 92a through the slot shaped nozzle 92. However, also cooling gas or another suitable cooling medium can be jetted in as a coolant. In one embodiment, the cavity can be configured circumferentially extending about the axis 7 within the support sprocket 22 and can be provided with a respective circumferentially extending slot shaped channel 92 for injecting the coolant.

Alternatively, as illustrated in the right half of FIG. 6, the coolant can be run through annular conductors 93 that are evident in a better manner from FIG. 8, wherein radial circumferentially distributed channels 94 branch off from the annular conductors from which the coolant is then injected into the channel 92 through jet shaped openings 95. The openings 95 can be configured evenly distributed about the axis 7 in the support collar 22 or optionally one or plural openings can be configured in a circumferential manner in the slot shaped collar 22.

The clamping sleeve 3 is cooled by the coolant in an adequate and very effective manner.

Alternatively or additionally, a temperature measurement unit 96 can be provided which is used for controlling the heating and cooling processes of the inductive clamping device and can be configured with typical conventional temperature sensors or similar.

Eventually, a hose 99 is provided at a tubular spout 97 at the housing element 98, wherein cooling fluid can be sucked or removed from the chamber 92a. Certainly, the suction device which is illustrated herein by the components 97 and 98 as well as the cooling medium conductor 90 and the temperature measurement unit can be configured differently and can be placed and arranged within the inductive clamping device in any suitable manner.

The invention claimed is:

1. A device for inductively clamping and unclamping a tool shaft of a tool in a tool holder which includes a clamping sleeve that is open at a free end and made from electrically conductive material for receiving the tool shaft through friction locking, wherein the clamping sleeve forms a rotation axis with the tool holder, with an induction coil assembly enveloping the clamping sleeve and including two coil units that are arranged on a same axis and that are axially adjustable relative to one another and that are included in a first concentrator assembly made from magnetically conductive and electrically non-conductive material, wherein the concentrator assembly envelops the induction coil assembly and with a second concentrator assembly made from magnetically conductive and electrically non-conductive material wherein the second concentrator assembly is formed from concentrator elements which are adjustable relative to the rotation axis with respect to their operating position for inductively heating the clamping sleeve, in which the concentrator elements at least partially cover a free face of the clamping sleeve, wherein the concentrator elements are configured to be feedable through a feeding movement relative to the rotation axis at a slant angle wherein the first and second concentrator elements are feedable at different locations around the rotational axis so that the feeding movement includes a radial and an axial component into their operating position in which the concentrator elements at least partially cover the free face of the clamping sleeve for inductively heating the clamping sleeve.

2. The device according to claim 1, wherein the movement of the concentrator elements is performed in a linear manner.

3. The device according to claim 1, wherein the concentrator elements are received in slides which are moveable at an angle $\alpha$ of 60° to 80° relative to the rotation axis in a linear manner.

4. The device according to claim 3, wherein the slides are made from magnetically non-conductive material, and the concentrator elements (46a, 46b) are received at a free end of the slides that is oriented in the direction of the rotation axis.

5. The device according to claim 4, wherein six slides are provided which are arranged in an annular group and moveably supported in linear oriented grooves of a support collar made from magnetically conductive material.

6. The device according to claim 3, wherein at least a portion of the slides, is configured with a stop bar from magnetically non-conductive material, which slightly protrudes as a stop beyond the face of the concentrator element oriented in a direction towards the clamping sleeve by 0.2 to 0.6 mm.

7. The device according to claim 3, wherein the control of the sliding movement of the slides is provided through cam pins at the slides which engage respective control curves of an adjustment ring.

8. The device according to claim 3, wherein a third concentrator assembly is provided which is arranged fixated in a radial intermediary space between the coil units and the concentrator elements received at the slides.

9. The device according to claim 8, wherein the device is configured with an annular induction attachment made from magnetically non conductive material and electrically conductive material, which is configured and/or arranged so that the induction attachment acting as an active shielding element generates an opposite magnetic field relative to magnetic scatter fields generated by the induction coil assembly.

10. The device according to claim 9, wherein the third concentrator assembly and/or the induction attachment are arranged at a cover ring arranged at the face side which is arranged at the housing or at the adjustment collar.

11. The device according to claim 3, wherein both coil units including the first concentrator assembly are adjustable relative to one another through a longitudinal support, wherein the support of the first concentrator assembly is provided along an inner support ring which is covered by an outer support ring that is arranged concentric to and above the inner support ring, wherein the two support rings interact with one another through a cam mechanism for axially adjusting the coil units.

12. The device according to claim 11, wherein the inner support ring includes a plurality of control curves at its outer circumference through which the outer support ring interacts through one cam.

13. The device according to claim 11, wherein a control collar for a linear feeding of the slides and of the second concentrator assembly is rotatably supported on the outer support ring.

14. The device according to claim 13, wherein support of an adjustment collar on the outer support ring is provided through a roller bearing.

15. The device according to claim 14, wherein gear sprockets are provided on the adjustment collar and the outer support ring for driving the adjustment collar and the outer support ring in rotation.

16. The device according to claim 15, wherein a drive of the sprockets of the adjustment collar and of the outer support ring is provided through a motor and through a transmission.

17. The device according to claim 16, wherein the motor and the transmission (for the adjustment collar and the motor and the transmission for the outer support ring are arranged on a common slide which is arranged on a linear support on a clamping table that is attached to the device so that both motors and transmissions are moved together with the outer support ring for an axial adjustment of both coil units.

18. The device according to claim 16, wherein a worm shaft is provided for driving the adjustment collar and the outer support ring, wherein the worm shaft engages the gear sprockets and has a self hemming effect.

* * * * *